US012809884B2

(12) United States Patent
Yoon et al.

(10) Patent No.: US 12,809,884 B2
(45) Date of Patent: Nov. 24, 2026

(54) ENHANCED OBJECT REPLICATION RECOVERY USING PLACEMENT GROUPS

(71) Applicant: NetApp, Inc., San Jose, CA (US)

(72) Inventors: Song Guen Yoon, Surrey (CA); Hai Ning Zhang, Surrey (CA); Dheeraj Raghavender Sangamkar, Surrey (CA); Chia-Chen Chu, Burnaby (CA); Alvin Zhu-Zhuang Lam, Vancouver (CA)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 19/234,684

(22) Filed: Jun. 11, 2025

(65) Prior Publication Data

US 2026/0133989 A1 May 14, 2026

Related U.S. Application Data

(60) Provisional application No. 63/719,477, filed on Nov. 12, 2024.

(51) Int. Cl.
*G06F 16/20* (2019.01)
*G06F 11/1446* (2026.01)
*G06F 16/27* (2019.01)

(52) U.S. Cl.
CPC .......... *G06F 16/27* (2019.01); *G06F 11/1469* (2013.01); *G06F 2201/815* (2013.01)

(58) Field of Classification Search
CPC . G06F 16/27; G06F 11/1469; G06F 2201/815
See application file for complete search history.

(56) References Cited

U.S. PATENT DOCUMENTS 10,078,656 B1 * 9/2018 Carl .................... G06F 16/2365
2024/0069758 A1 * 2/2024 Groves ................. G06F 3/0625

FOREIGN PATENT DOCUMENTS

CN 116368458 A * 6/2023 ........... G06F 3/0605

OTHER PUBLICATIONS

English Translation of CN 116368458 A (Year: 2023).*

* cited by examiner

*Primary Examiner* — Diedra McQuitery

(57) ABSTRACT

An object storage system with enhanced processes for managing replicas of data objects. Storage nodes of the object storage system receive replicas of objects to store. In response, a storage node identifies one of multiple virtual object space and its corresponding placement group to associate with the replica of the object. The storage node identifies a storage device associated with the virtual object space, stores the replica on the storage device, and updates system metadata to associate the placement group with the replicated object. In response to a restoration event for a storage device of the system, a storage node identifies associated virtual object spaces and placement groups for the effected storage device. Using the identified virtual object spaces and placement groups, the storage node identifies the objects needing restoration and restores replicas of the objects to a different storage device of the system.

20 Claims, 11 Drawing Sheets

ENHANCED OBJECT REPLICATION RECOVERY USING PLACEMENT GROUPS

CROSS-REFERENCE TO RELATED APPLICATIONS

The present application claims priority to and the benefit of U.S. Provisional Patent Application No. 63/719,477, filed Nov. 12, 2024, entitled "Replication With Fast Data Recovery," which is commonly owned and incorporated herein by reference in its entirety for all purposes.

BACKGROUND

Object storage systems are widely used in distributed computing environments to store and manage large volumes of unstructured data. To ensure robust fault tolerance and high degrees of data availability, some systems commonly replicate data objects and store the replicas on multiple physical storage devices (e.g., drives) across different storage nodes. Replication of data objects across multiple storage nodes may be used instead of more complex redundancy techniques (e.g., RAID) in order to minimize costs.

Unfortunately, when a storage device in replication-based storage system undergoes a restoration event (e.g., failure, decommissioning, etc.), identifying which specific replicas the storage device held, and which data objects must be restored remains a persistent challenge. Consequently, determining which data objects need to be restored from other replicas is a complex and time-consuming process. This challenge arises because the system must analyze extensive metadata to identify and track down the exact location of each data object to ensure restoration of the storage device. Conventional approaches attempt to address this challenge include techniques designed to ensure data integrity like periodic background scrubbing, full metadata scans, or static replication tracking. Unfortunately, these techniques can be computationally expensive and slow to respond to real-time restoration events. Moreover, the sheer scale of modern object storage systems exacerbates these issues, making it particularly impractical to scan the entire system or read the entire system metadata in order to audit the number of replicas for each object and identify replicas to restore.

The challenges faced in identifying the replicas needing restoration can increase the time required to restore those replicas, resulting in extended periods where less than the intended number of replicas for a given object are present in the object storage system. When an object storage system operates with less than the intended number of replicas for a given object, the system is at an increased risk of data loss for that object until replicas of the object can be restored (i.e., stored on a different drive of the object storage system).

SUMMARY

Disclosed herein are systems and techniques that provide for an object storage system with enhanced processes for managing replicas of data objects through the use of placement groups. Storage nodes of the object storage system receive replicas of objects to store. Upon receiving a replica of an object, a storage node identifies one of multiple virtual object space to associate with the object to which the replica corresponds. Each virtual object space refers to a unique portion of storage resources of the data storage system in which data objects can be stored and accessed. Each virtual object space is associated with a placement group of the system. A placement group is a logical grouping of virtual object spaces, where virtual object space of a given placement group store replicas of the same objects (i.e., the virtual object spaces of a particular placement group are copies of each other). To ensure that each virtual object space of a particular placement group stores replicas for the same set of data objects, a first storage node may replicate the data object and distribute the replicas to other storage nodes. The first storage node directs the other storage nodes to store the replicas in storage devices associated with virtual objects spaces such that each replica is stored in a virtual object space of the same placement group.

The storage node identifies the particular storage device associated with the virtual object space and stores the replica on the storage device. Should the storage device fail, the object replicas in the associated virtual object space are lost to the failure. Once the object is stored in the storage device, the storage node corresponding to the storage device updates metadata of the system to associate the placement group with the replicated object. By tracking the storage of objects on particular storage devices through virtual object spaces and by tracking the placement group that each virtual object space belongs to, objects lost to storage device failure can efficiently be replaced. In response to a storage device failure, the object storage system identifies the virtual object space for the object effected by the failure, identifies the placement group corresponding to that virtual object space, identifies another virtual object space of that placement group, acquires the objects from the other virtual object space, and rebuilds the objects on another storage device to repair the objects lost to the failure.

In some embodiments, the metadata is used to restore content of a storage device undergoing a restoration event. In such cases, the metadata may associate objects with placement groups, placement groups with virtual object space, virtual object space with storage devices, or a combination thereof. In response to the restoration event, a storage node of the system restores the content to a different storage device of the system. In some embodiments, restoring the content includes identifying virtual object space(s) associated with the storage device experiencing the restoration event, identifying placement group(s) associated with the virtual object space(s), and identifying object(s) associated with the placement group(s). In some embodiments, the storage node obtains replicas for the object(s) and stores the replicas on a different storage device to restore the objects.

This Summary introduces a selection of concepts in a simplified form that are further described below. It may be understood that this Summary is not intended to identify key features or essential features of the claimed subject matter, nor is it intended to be used to limit the scope of the claimed subject matter.

BRIEF DESCRIPTIONS OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

DETAILED DESCRIPTION

Figure 1:
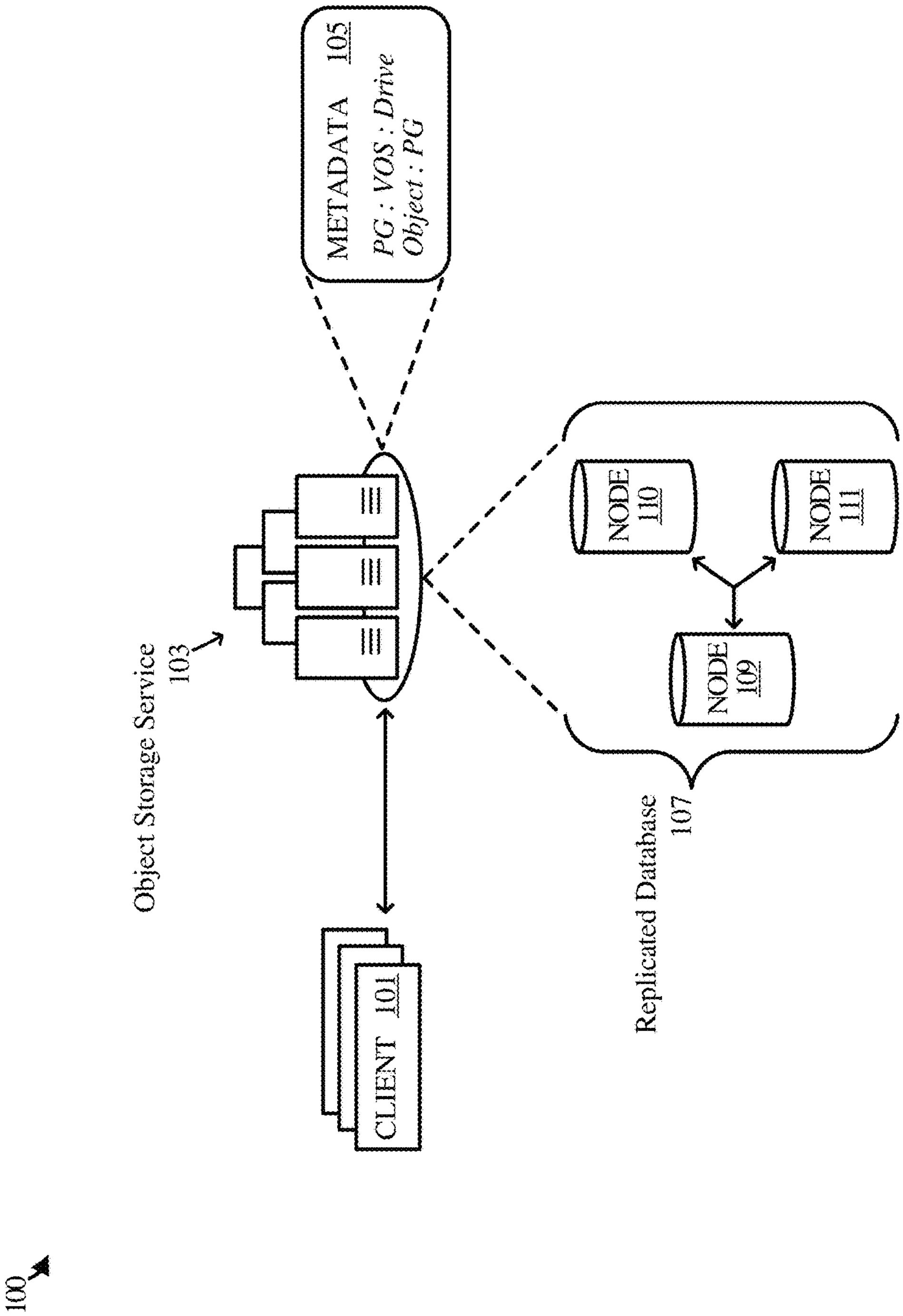
FIG. 1 illustrates an operating environment in accordance with an implementation.

Systems and techniques are disclosed herein for providing an object storage system with enhanced processes for managing (e.g., storing and recovering) replicas of data objects. When a storage device (e.g., a drive) of a storage node in an object storage system experiences a restoration event such as a failure or a decommissioning, the content of the storage device must be restored as quickly as possible in order to minimize the period in which less than the anticipated number of replicas for a given data object are present in the system. To enhance the identification of replicas needing restoration because of a restoration event, object replicas are stored in accordance with placement group and virtual object space (virtual object space) framework.

To store a replica of an object, a storage node of the object storage system identifies a virtual object space to associate with the replica. A virtual object space is representative of a subset of the storage resources available to a given storage node. The storage resources of a given storage device can be divided up into multiple virtual object spaces. Each virtual object space is made up of a unique subset of storage resources of the storage device, and the storage associated with a given virtual object space are associated with only that virtual object space. The virtual object space identified by the storage node is one of multiple virtual object space associated with a placement group. For example, the storage resources of a given storage node may be divided into multiple virtual object spaces, each of which corresponding to a different region of the storage resources. The region of storage resources associated with each virtual object space may be continuous or discontinuous.

In some embodiments, each virtual object space of the placement group is hosted by a different one of the storage nodes of the system. The storage node identifies a storage device associated with the identified virtual object space and stores the replica on the storage device. The storage node updates metadata of the object storage system to reflect the association between the object being replicated and the placement group associated with the virtual object space. In some embodiments, each virtual object space of the placement group are identical. To achieve this, each replica of a given data object is placed into a virtual object space corresponding to the same placement group.

Storing objects in accordance with the placement group and virtual object space framework facilitates improved recovery for replicas that need restoration due to a restoration event (e.g., failure, decommissioning, etc.). Where a storage device (e.g., a drive) experiences a restoration event, the virtual object space(s) associated with the storage device are identified. The virtual object space(s) are then used to identify placement group(s) associated with the virtual object space(s), which can be leveraged in several ways. In some embodiments, the placement group is used to identify other similar virtual object space of the placement group. In such embodiments, the storage node requests the content of the other similar virtual object space and stores the content to another storage device. In some embodiments, the storage node identifies the individual objects associated with the placement group and acquires the objects on an individual basis. In such embodiments, the storage node acquires each of the replicas needing restoration and stores the replicas to another storage device.

Various embodiments of the present technology provide for a wide range of technical effects, advantages, and/or improvements to computing systems and components. For example, various embodiments may include one or more of the following technical effects, advantages, and/or improvements: 1) non-routine and unconventional application of object storage processes, allowing for improved identification of replicas in need of restoration; 2) non-routine and unconventional systems and algorithms for efficiently managing replicas of data objects to improve restoration from a drive failure; 3) non-routine and unconventional operations for creating logical constructs called replication groups so that when a drive in a cluster fails, the replication group(s) associated with the failed drive can quickly be ascertained from associated metadata; 4) non-routine and unconventional system and methods to improve resiliency and reduce rebuild times in systems that use replication-based strategies for redundancy; 5) non-routine and unconventional modification to the node operation to efficiently track locations of replicated data objects for improved acquisition and restoration of data objects; and 6) non-routine and unconventional use of virtual object spaces to logically track various replicas, allowing for efficient acquisition and restoration of the identified objects in need of restoration.

FIG. 1 illustrates operational environment 100 in accordance with an embodiment. Operational environment 100 includes client 101, object storage service 103, metadata 105, and replicated database 107. Replicated database 107 further includes node 109, node 110, and node 111.

Client 101 is representative of one or more clients of object storage service 103. Client 101 interacts with object storage service 103 to carry out object storage processes. Examples of such processes include Put Object processes, Get Object processes, Delete Object processes, and the like.

Object storage service 103 is representative of software, hardware, and/or firmware for providing client 101 with a scalable system for storing and retrieving unstructured data (i.e., objects). Examples of such systems include distributed object storage systems and the like. One example of a distributed object storage system is given by STORAGEGRID® offered by NETAPP®. Object storage service 103 may be executable instructions that, when executed by a processor of a computing device, direct the computing device to perform object storage processes in accordance with the methods and techniques described herein. An example of such a computing device is given by computing device 1005 of FIG. 10.

Object storage service 103 leverages the storage resources provided by replicated database 107 in order to provide services to client 101. Replicated database 107 is generally representative of a system in which data is copied and maintained across multiple servers or locations to ensure high availability and fault tolerance. Examples of such systems include primary-replica databases, multi-master replicated databases, quorum-based replicated databases, eventually consistent replicated databases, and the like. One such system is STORAGEGRID® offered by NETAPP®. Object storage service 103 can be implemented a single-site or multisite cluster of nodes that function and are managed as a single system called a grid. An object can be ingested into the grid at any location and retrieved from the grid at a different location. Each of the servers or locations that make up replicated database 107 can be referred to as a node. The servers or locations of replicated database 107 are illustrated by node 109, node 110, and node 111, though other embodiments may include replicated databases with more or fewer nodes. Moreover, object storage service 103 may be configured in a single tenant or a multiple tenant configuration.

Object storage service 103 maintains metadata 105 to track object ongoing or completed storage processes and to facilitate subsequent storage processes. When performing object storage processes, object storage service 103 updates metadata 105 such that metadata 105 can be used to identify objects (or object replicas) associated with storage devices of any of node 109, node 110, or node 111. In some embodiments, metadata 105 includes information that associates physical storage devices (e.g., drives) with logical groupings of objects referred to as virtual object spaces. A virtual object space is representative of a subset of the storage resources available to a given storage node (e.g., node 109). The storage resources of node 109, node 110, and/or node 111 can be divided up into multiple virtual object spaces. Each virtual object space is made up of a unique subset of storage resources for a particular storage device. The portions of storage associated with a given virtual object space are associated with only that virtual object space. The virtual object space is one of multiple virtual object space associated with a placement group. Different virtual object spaces that share the same object replicas are logically grouped together such that should a drive or other storage device associated with one of the virtual object spaces fail, the counterpart virtual object spaces from the same placement group can quickly be identified and used to restore the replicas of data objects lost to the failure.

In some embodiments, metadata 105 further includes information that associates virtual object spaces with logical groups of virtual object spaces referred to as placement groups. In some embodiments, metadata 105 further includes information indicating which storage nodes of replicated database 107 hold which virtual object spaces corresponding to which placement groups. In some embodiments, metadata 105 includes information indicating which objects or replicas of objects are associated with which placement groups.

Figure 2:
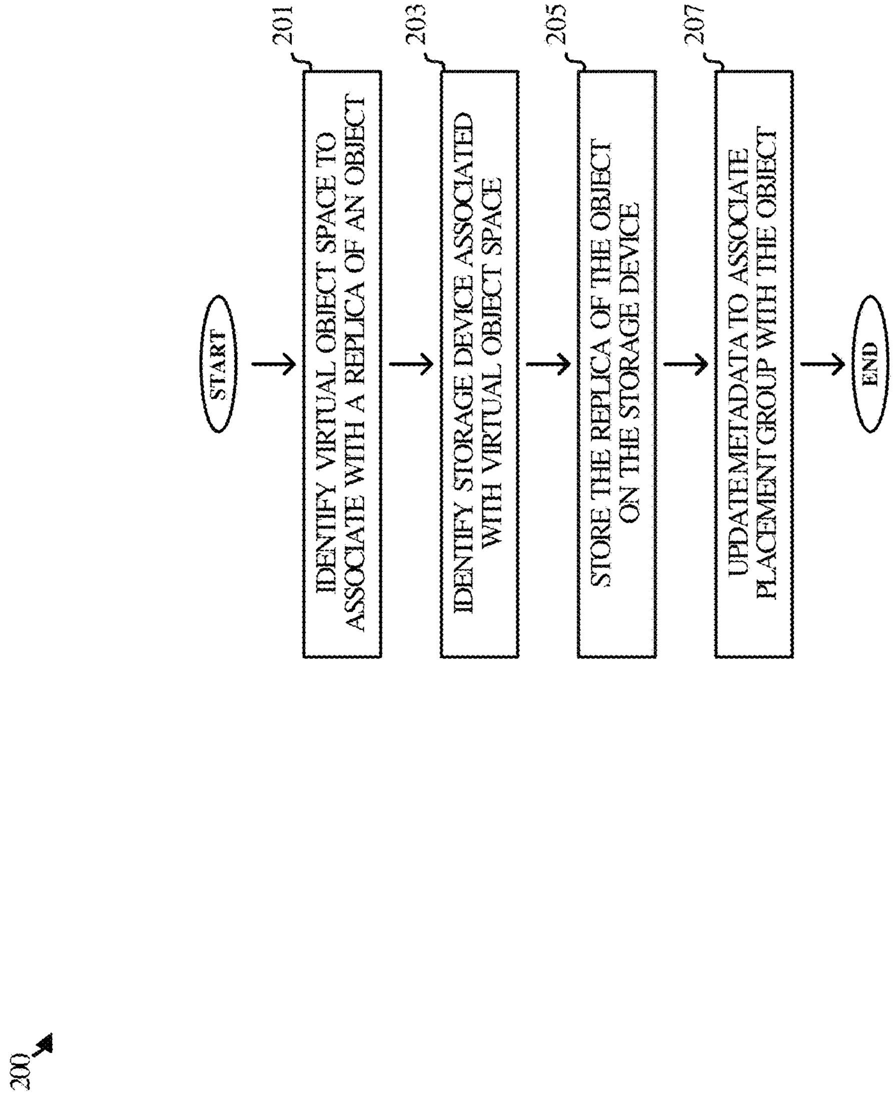
FIG. 2 illustrates a storage method in accordance with an implementation.

FIG. 2 illustrates storage method 200 in an implementation. Storage method 200 is representative of a process for managing (e.g., storing) replicas of data objects in an object storage system. Storage method 200 may be implemented in program instructions in the context of the software and/or firmware elements of each of object storage service 103, node 109, node 110, and node 111, or a combination thereof. Each of object storage service 103, node 109, node 110, and node 111 are of FIG. 1 and are described in the text associated with FIG. 1. The program instructions, when executed by one or more processing devices of one or more computing systems (e.g., computing device 1005 in FIG. 10), direct the one or more computing systems to operate as follows, referring parenthetically to the steps in FIG. 2, and in the singular to a computing device for the sake of clarity.

To begin, a computing device (e.g., a storage node such as node 109) identifies a virtual object space (step 201). In some embodiments, a virtual object space is logically instantiated as part of an object ingestion process utilized when initially storing an object in accordance with the techniques defined herein. In some embodiments, virtual object spaces are created at the time an object is ingested. In some other cases, virtual object spaces may be pre-instantiated. In some embodiments, each storage node (e.g., node 109, node 110, or node 111) of a replicated database (e.g., replicated database 107) includes a distributed mechanism for creating virtual object spaces during object ingestion (e.g., a Local Distribution Router mechanism). In some embodiments, the structure of a virtual object space is immutable and does not change once becoming associated with object data. In some embodiments, initially defining a virtual object space includes at least associating the virtual object space with one or more identifiers for the object being stored and mapping the association between the data object stored in the virtual object space and a storage node associated with the virtual object space. In some embodiments, a virtual object space is identified from a pool of virtual object spaces that are not yet associated with objects. Here, a virtual object space may be identified from the pool and then subsequently associated with a data object. In any case, a virtual object space may be freshly instantiated during the ingestion of a data object, selected from a pool of unassociated virtual object spaces, or identified by some other means. In some cases, a virtual object space may be identified and referred to by reference to the data object being stored in the virtual object space. Where the virtual object space was initially unassociated with a data object, the virtual object space may be associated with some other identifier. In such cases, the other identifier may then be replaced by an identifier associated with the object such that the virtual object space can then be referred to by the object identifier.

The computing device associates the virtual object space with a storage device of a node (e.g., node 109, node 110, or node 111) of a replicated database (e.g., replicated database 107). The computing device identifies the virtual object space so that a replica of an object can be associated with the virtual object space. In some embodiments, the virtual object space is identified from a pool of available virtual object spaces. In some embodiments, the virtual object space is generated for the object at the time a data object is ingested. Where the virtual object space is identified from a pool of available virtual object spaces, but no virtual object space is available in the pool, a new virtual object space may be generated for the data object.

In some embodiments, a virtual object space can be conceptually thought of as a container or folder that holds a collection of related data objects. In such embodiments, the data objects associated with a given virtual object space correspond to each other by virtue of their association with the virtual object space. In some embodiments, a virtual object space may take the form of any sufficient data structure for the holding of a collection of related data objects. In some embodiments, one or more virtual object spaces me be associated with data objects relating to a particular process, project, enterprise, or combination thereof. For example, a virtual object space could store all the data files for a specific application or of a specific type.

Each virtual object space included in the object storage service is configured such that each virtual object space corresponds to storage resources entirely within a single storage device (e.g., drive). In some embodiments, virtual object spaces are created at the time of object ingestion for each object being stored by the distributed object storage system. In such cases, each virtual object space becomes immutably associated with the associated object or objects. Where a virtual object space holds more than one object, the virtual object space may be given a unique identifier by which the virtual object space may be referenced. In such scenarios, the mapping that associates data objects to virtual object spaces and virtual object spaces to nodes can be implemented by virtue of the unique identifier for the virtual object space. In scenarios where each virtual object space holds a single object, there may be millions or billions of virtual object spaces to account for each of the data objects stored in a large-scale system.

Each virtual object space may be associated with any number of objects or replicas of objects. In some embodiments, each virtual object space may be associated with up to one million objects, replicas of objects, or a combination thereof. In some embodiments, the architecture of the distributed storage system limits the capacity of a given virtual object space with regard to the number of objects that can be associated with the virtual object space. This limit may be the result of memory constraints, metadata management constraints, or other constraints of the object storage system that limit the number of data objects associated with a given virtual object space. In some other embodiments, more or fewer data objects may be associated with a given virtual object space.

In other words, a storage device may hold many objects in the storage resources associated with a single virtual object space. A given storage device may be associated with a number of virtual object space. In some embodiments, each virtual object space is part of a placement group that includes multiple other virtual object spaces. In such embodiments, a replica of a given object may be stored in the storage device associated with each virtual object space of the placement group. As a result, each virtual object space of the placement group includes the same objects or replicas of objects and can therefore be leveraged to restore a virtual object space. See Table 1 for an example of the similar constituent objects in each virtual object space. The mapping between placement groups, virtual objects spaces, and nodes can further be seen below in Table 2.

TABLE 1

| Placement Group | Virtual Object Space | Objects |
|---|---|---|
| I | A | 1, 2, 3, 4 |
| | B | 1, 2, 3, 4 |
| II | C | 5 |
| | D | 5 |
| III | E | 6, 7, 8 |
| | F | 6, 7, 8 |

TABLE 2

| Node | Virtual Object Space | Objects |
|---|---|---|
| 001 | A, F | 1, 2, 3, 4, 6, 7, 8 |
| 002 | B, D, E | 1, 2, 3, 4, 5, 6, 7, 8 |
| 003 | C | 5 |

A placement group can be conceptually thought of as a higher-level container acting like a directory that organizes multiple virtual object spaces. A placement group may be associated with a particular process, project, enterprise, or combination thereof. Each of the virtual object spaces organized into a given placement group are associated with each other by virtue of their association with the placement group. In some embodiments, two initially unassociated virtual object spaces may be used to store replicas of a given object. As a result, the two virtual object spaces are associated through the creation of a new placement group. The newly instantiated placement group is generated through the updating of metadata 105, which is revised to indicate that the two virtual object spaces are now associated as a result of each storing a replica of the same object. Should a subsequent object become associated with either of the virtual object spaces, the other virtual object space of the placement group will also become associated with a replica of the object.

In some cases, the object is received directly from a client of the object storage system (e.g., client 101), while in other cases the object is received via another storage node of the system. In some cases, a storage node receives the data object and generates replicas of the data object. In such cases, the storage node may distribute the generated replicas to other storage nodes of the system for storage. In some cases, a storage node receives, for storage, a data object replica generated by another storage node. Whether the storage node generates the replica from an object or else receives a previously generated replica, the storage node processes the replica for storage.

Once the computing device identifies the virtual object space, the computing device then identifies a storage device associated with the virtual object space (step 203). The storage device may be a drive or any other suitable storage medium sufficient to store data objects. The virtual object space is associated with storage of the storage device such that when a replica is stored in that particular storage of the storage device, the association between the replica and the virtual object space (or the placement group of the virtual object space) can be recorded. In some embodiments, metadata of the storage system (e.g., metadata 105) is used to identify the storage device associated with the identified virtual object space. Further examples of such metadata are given by metadata tables 500 of FIG. 5.

The computing device then stores the replica of the object on the identified storage device (step 205). In some embodiments, a given storage device may be associated with multiple virtual object spaces. In such scenarios, each virtual object space is associated with different portions of the storage of the storage device such that an object stored on the storage device is only associated with one of the multiple virtual object spaces. To store the replica of the object on the storage device in accordance with the identified virtual object space, the replica is stored on the specific portions of the storage of the storage device that are associated with the identified virtual object space. To store the data object, the data for the data object is written to the storage resources associated with the virtual object space. Once the replica is stored on the storage device, the computing device updates metadata of the object storage system (e.g., metadata 105) to reflect the association between the object for which the replica was a copy and the placement group associated with the identified virtual object space (step 207). In an example, an object is received at a first node and is replicated three times. Including the originally received instance of the object, there are now four total instances of the object. The first node stores one of the instances and distributes the other three to other nodes for storage. The first node identifies a virtual object space, either from an existing virtual object space that is available or by generating a new virtual object space and associates the object with the virtual object space by updating storage metadata. The first node stores the object in a virtual object space that is associated with a first placement group. When distributing the other instances of the object, the first node directs the other nodes to store the object in a virtual object space therein that is also associated with the placement group. As a result, while each of the four instances of the object are stored in different nodes and are associated with different virtual object spaces, each of the instances correspond to the same placement group. As a result, when a particular storage device storing a data object in accordance with the techniques herein fails, the virtual object space can be used to quickly identify the placement group, which supports a quick identification of another virtual object space of the placement group and thus facilitates a recovery of the object lost to the failure from another node.

Figure 3:
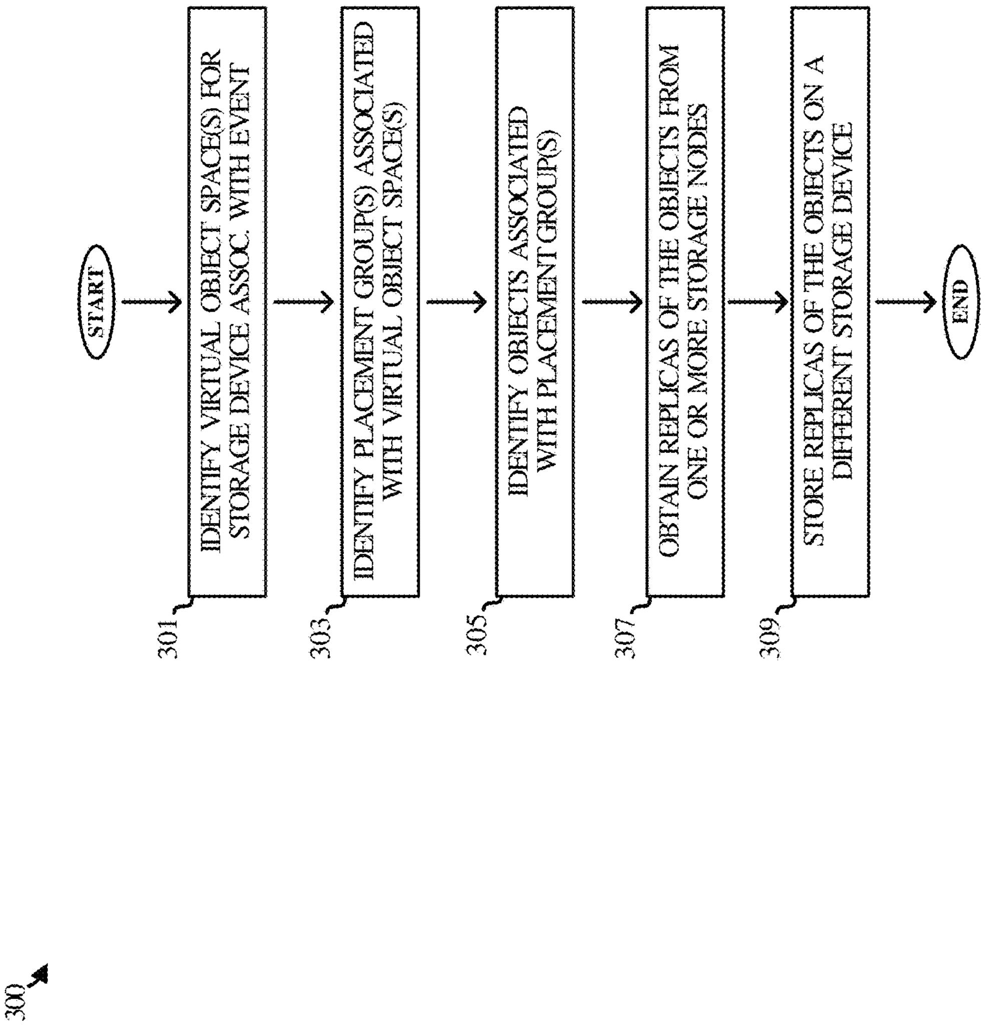
FIG. 3 illustrates a restoration method in accordance with an implementation.

FIG. 3 illustrates restoration method 300 in an implementation. Restoration method 300 is representative of a process for managing (e.g., restoring) replicas of data objects in an object storage system. Restoration method 300 may be implemented in program instructions in the context of the software and/or firmware elements of each of object storage service 103, node 109, node 110, and node 111, or a combination thereof. Each of object storage service 103, node 109, node 110, and node 111 are of FIG. 1 and are described in the text associated with FIG. 1. The program instructions, when executed by one or more processing devices of one or more computing systems (e.g., computing device 1005 in FIG. 10), direct the one or more computing systems to operate as follows, referring parenthetically to the steps in FIG. 3, and in the singular to a computing device for the sake of clarity.

To begin, a computing device (e.g., a storage node such as node 109) identifies virtual object spaces corresponding to a storage device associated with a restoration event (step 301). The restoration event may be a failure of the storage device, a decommissioning of the storage device, a failure of a storage node that includes the storage device, a decommissioning of the storage node that includes the storage device, or any other event that results in a need to restore the content of a particular storage device. Once the computing device identifies the one or more virtual object spaces associated with the storage device, the computing device identifies one or more placement groups associated with the one or more virtual object spaces (step 303). In some embodiments, each virtual object space that is associated with the storage device corresponds to a different placement group.

The computing device then identifies objects associated with each of the one or more placement groups (step 305). To identify the associated objects for each placement group, the computing device identifies objects associated with the corresponding virtual object space of the placement group. To carry out this step, the computing device leverages storage metadata and reads the metadata to identify the objects. In some cases, the placement group is referenced by a unique identifier in the storage metadata, by which the computing device can search through the metadata to identify the corresponding objects.

In some embodiments, step 305 can be skipped. With the objects identified, the computing device obtains replicas of the objects from one or more storage nodes of the object storage system (step 307). In some embodiments, the objects can be further identified by virtue of identifying and subsequently obtaining the entire virtual object space associated with the storage device, making the identification of individual objects unnecessary. The replicas of the objects may be obtained from the one or more other storage nodes by requesting a replica of each individual object from the other storage node(s) or may otherwise be obtained by requesting the content of an entire virtual object space from one of the other storage nodes.

Once the replicas of the objects have been obtained, the computing device stores the replicas on a different storage device than the storage device associated with the restoration event (step 309). By storing the replicas (e.g., content) from the storage device associated with the restoration event on a different storage device, the replicas are effectively restored (e.g., a new copy is added to storage to account for the lost copies). In some cases, once the replicas are restored to the different storage device, a virtual object space of the different storage device is subsequently added to the placement group of the storage device associated with the restoration event. In some cases, once the replicas are restored to the different storage device, a new virtual object space is established in association with the replicas and added to the placement group of the storage device associated with the restoration event. In some scenarios, once the data objects associated with the failure of the storage device have been restored to another storage device, the virtual object space associated with the failed device may be deleted or otherwise cleared for later use. In some cases, multiple failures may result in the need for replacing multiple instances of data objects lost to failure. For example, a given replication scheme may require the storage of at least three replicas for each data object. Where two storage devices holding instances of that object fail, the restoration of two instances of the data object are needed in order to satisfy the replication scheme.

Figure 4:
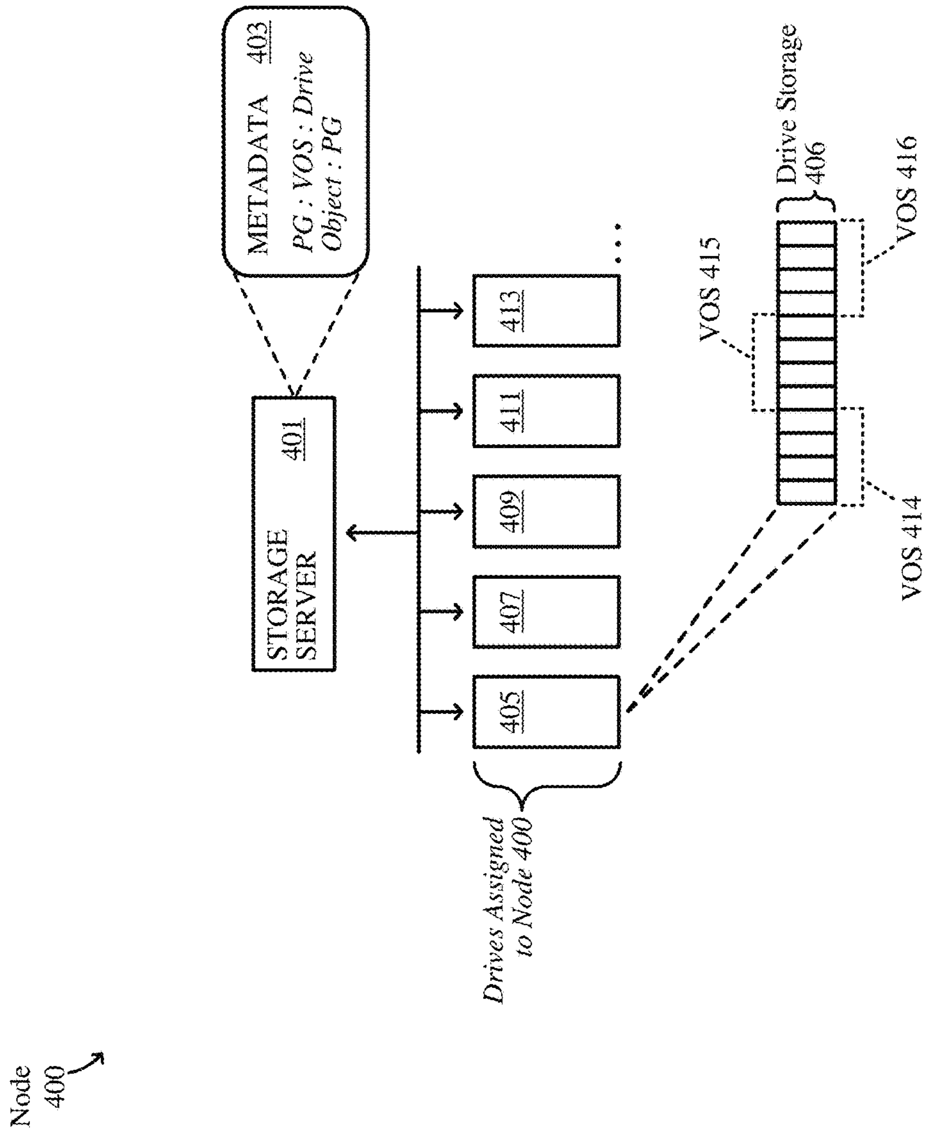
FIG. 4 illustrates a storage node in detail in accordance with an implementation.

FIG. 4 illustrates storage node in detail 400 in accordance with an embodiment, hereinafter referred to as node 400. Node 400 includes server 401, drive 405, drive 407, drive 409, drive 411, and drive 413. Server 401 further includes metadata 403. Drive 405 further includes drive storage 406, which further includes virtual object space 414, virtual object space 415, and virtual object space 416. Node 400 is generally representative of a node in an object storage system, examples of which are given by node 109, node 110, and node 111 of FIG. 1 and are described in the associated text.

Server 401 is generally representative of a computing device for providing an object storage service. Server 401 receives objects to replicate from a client, such as client 101 of FIG. 1. In response, server 401 carries out object storage processes for the object, examples of which are provided by storage method 200 of FIG. 2 and restoration method 300 of FIG. 3.

To facilitate object storage processes, server 401 leverages the storage resources provided by drive 405, drive 407, drive 409, drive 411, and drive 413. Server 401 further uses metadata 403 in order track the placement of the replicas and the associations between various replicas, storage devices, and placement groups. Examples of such metadata are given by the elements of FIG. 5 and the associated text. In some embodiments, server 401 tracks the placement of replicas and the relevant logical associations through recording the unique identifiers associated with each data object, placement group, virtual object space, and node in metadata 403. Each of drive 405, drive 407, drive 409, drive 411, and drive 413 are collectively representative of drives assigned to node 400. Server 401 stores replicas in each of drive 405, drive 407, drive 409, drive 411, and drive 413. Once the replicas are stored on drive 405, drive 407, drive 409, drive 411, drive 413, or some combination thereof, server 401 updates metadata 403 to reflect the association between the replicated objects and the placement groups for the virtual object space associated with the given drive.

Drive storage 406 is generally representative of a range of storage resources associated with a particular storage device. Here, drive storage 406 represents the range of storage resources of drive 405. Drive storage 406 may include more or fewer storage resources and may be divided into more or fewer virtual object spaces than the example illustrated in FIG. 4. Drive storage 406 is divided into virtual object spaces 414, 415, and 416. Each of virtual object spaces 414, 415, and 416 are representative of virtual object spaces that can be associated with replicas of data objects that are stored in drive 405. For example, where a replica of a data object is stored in the storage resources of storage drive 405 that correspond to virtual object space 414, metadata 403 can be updated to reflect that the replica of the object is now associated with virtual object space 414. Should drive 405 subsequently fail, the replica of the object can be identified through metadata 403, which will indicate that drive 405 was associated with virtual object spaces 414, 415, and 416, and that virtual object space 414 was associated with the replica of the object.

Figure 5:
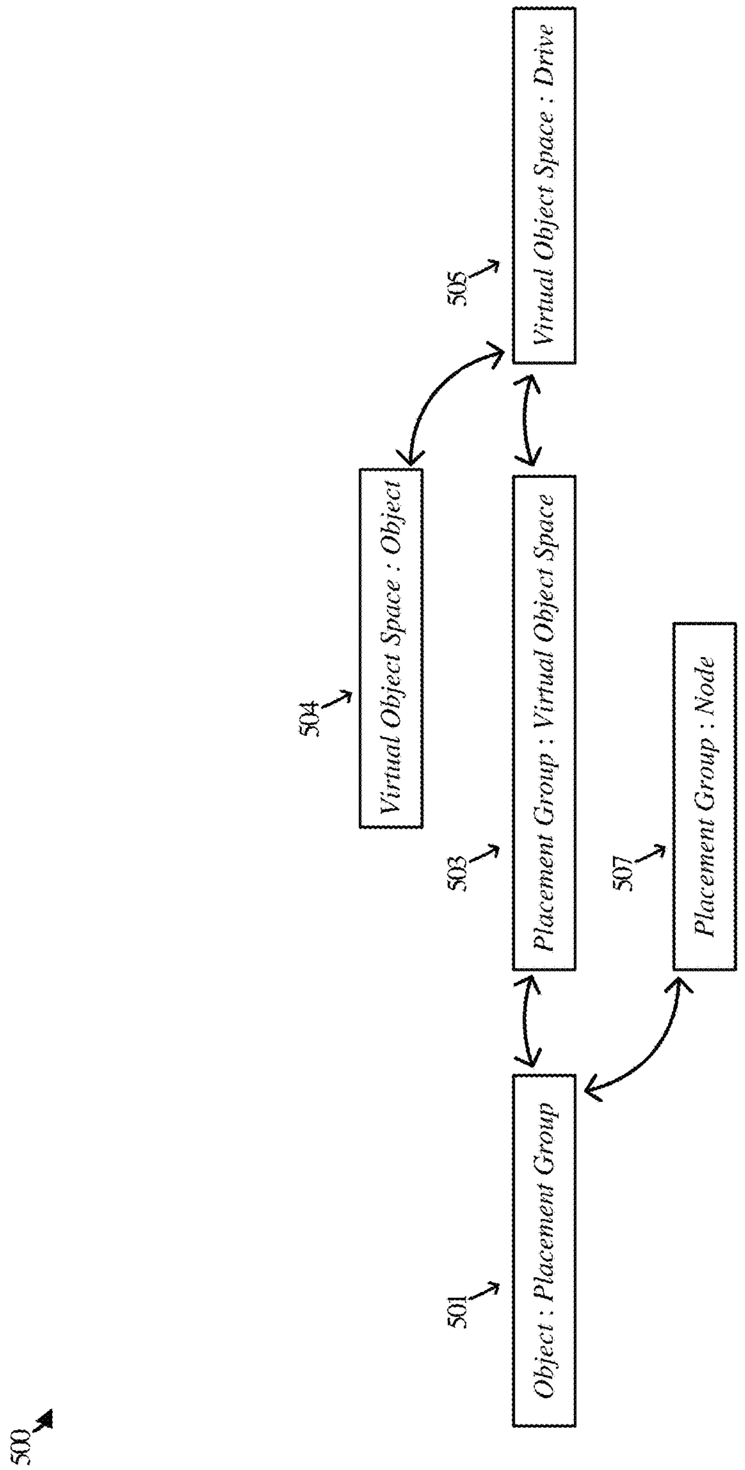
FIG. 5 illustrates metadata tables in accordance with an implementation.

FIG. 5 illustrates metadata tables 500 in accordance with an embodiment. Metadata tables 500 includes table 501, table 503, table 504, table 505, and table 507.

Generally, each of table 501, table 503, table, 504, table 505, and table 507 are representative of data structures of an object storage system used to hold information indicating associations between various storage devices of an object storage system, replicated objects of the object storage system, and logical abstractions for grouping objects of the object storage system. In some embodiments, more or fewer details may be included in metadata tables 500.

In particular, table 501 includes information that indicates associations between objects and placement groups. Where the object storage service stores a replica of an object in a storage device associated with a virtual object space, the placement group corresponding to the virtual object space becomes associated with the object the replica is a copy of by virtue of the association being recorded in table 501. Table 503 includes information that indicates associations between placement groups and virtual object spaces. Table 504 includes information that indicates associations between virtual object spaces and objects. Table 505 includes information that indicates associations between each virtual object space of the object storage system and a corresponding storage device (e.g., drive).

In an example operation, a replica of an object can be stored by an object storage service leveraging metadata tables 500. Using table 501, the object storage service identifies a virtual object space, and the storage device associated with the virtual object space. Once the replica of the object is stored on the storage device, the object storage service updates metadata tables 500. In some embodiments, the object storage service updates table 504 to indicate the association between the previously identified virtual object space and the object for which the replica is being stored. In some embodiments, the object storage service updates table 501 to indicate the association between the placement group associated with the previously identified virtual object space and the object for which the replica is being stored.

In another example operation, a replica of an object can be restored by an object storage service leveraging metadata tables 500. Where a restoration event affecting a storage device of the object storage service occurs (e.g., failure, decommissioning, etc.), the object storage service can first identify virtual object spaces associated with the storage device by reading table 505. In some embodiments, the object storage service identifies the objects of the associated virtual object spaces through table 504 and obtains replicas of the identified objects. In some embodiments, the object storage service uses other combinations of metadata tables 500 to identify the objects of the associated virtual object spaces and obtains replicas of the identified objects.

Figure 6A:
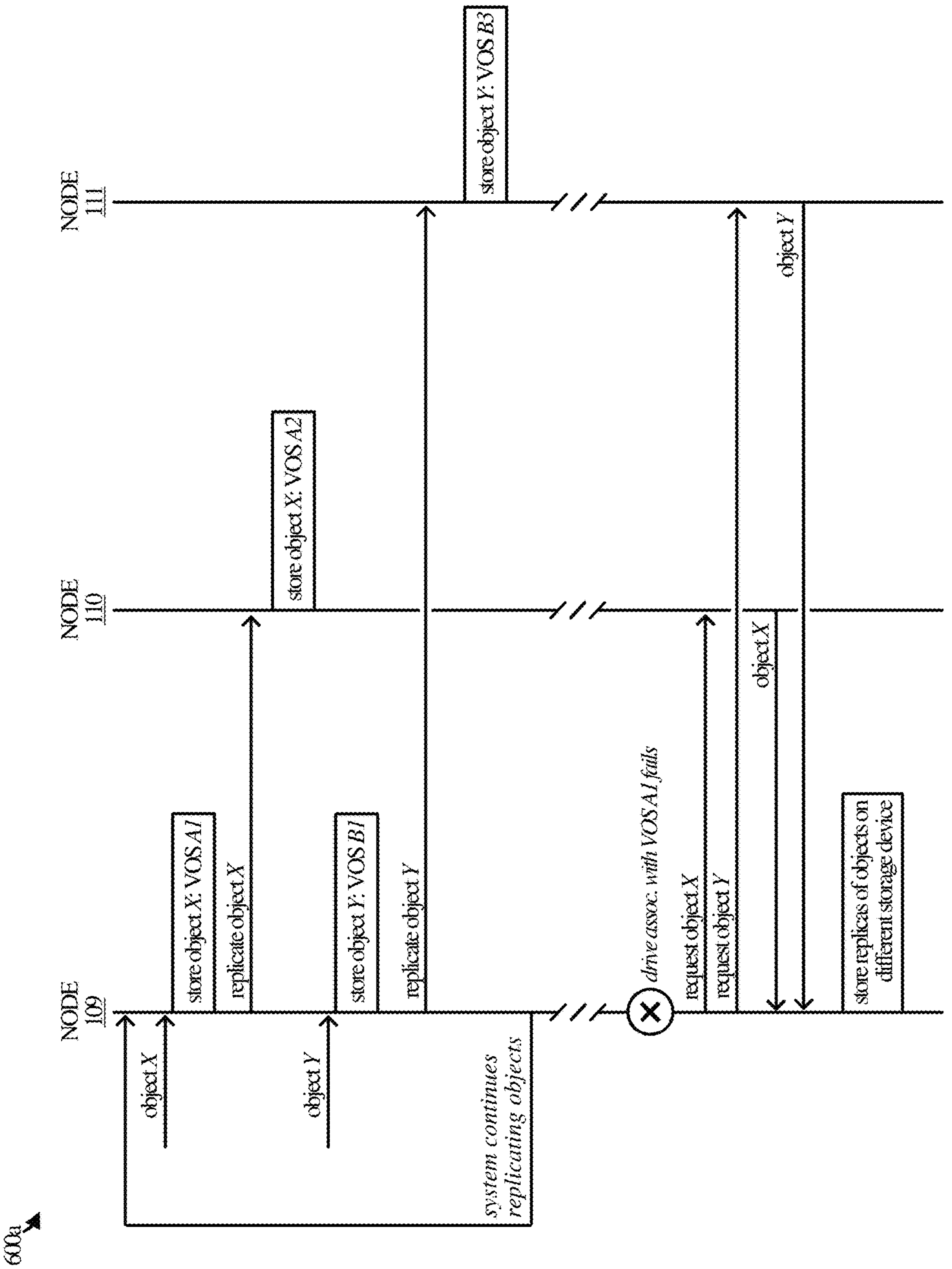
FIG. 6A illustrates an operational sequence in accordance with an implementation.

FIG. 6A represents operational sequence 600*a* in accordance with an embodiment. Operational sequence 600*a* includes node 109, node 110, and node 111, each of FIG. 1, respectively. Each of node 109, node 110, and node 111 are described in detail in the text associated with FIG. 1. Operational sequence 600*a* is generally representative of a replica storing process and may be considered with regard to the steps and elements of each of the preceding figures.

To begin, node 109 receives object X for replication and storage. Node 109 stores an instance (i.e., replica) of object X in a storage device of node 109 and distributes a copy of object X to node 110. Node 109 associates the stored replica of object X with virtual object space A1. Node 110 stores an instance of object X in a storage device of node 110 and associates the replica with virtual object space A2.

Node 109 then receives object Y for replication and storage. Node 109 stores an instance (i.e., replica) of object Y in a storage device of node 109 and distributes a copy of object Y to node 111. Node 109 associates the stored replica of object Y with virtual object space B1. Node 111 stores an instance of object Y in a storage device of node 111 and associates the replica with virtual object space B3.

Each of node 109, node 110, and node 111 continue receiving, replicating, and storing objects. At some point, a storage device of node 109 undergoes a restoration event. In the embodiment shown in FIG. 6A, the restoration event is a drive failure. In response, node 109 looks up the virtual object spaces associated with the storage device. Node 109 then looks up the placement groups associated with the virtual object spaces and the objects associated with the placement groups. In some embodiments, node 109 reads metadata (e.g., metadata tables 500 of FIG. 5) in order to identify the virtual object spaces associated with the storage device, the placement groups associated with the virtual object spaces, and the objects associated with the placement groups.

Node 109 identifies that virtual object space A1 and virtual object space B1 were associated with the storage device of node 109 that underwent the restoration event. Node 109 then identifies object X is associated with virtual object space A1 and object Y is associated with virtual object space B2 and therefore replicas of both object X and object Y were stored on the storage device. Node 109 then requests and receives an instance of object X from node 110 and an instance of object Y from node 111. In other scenarios, node 110 may obtain either or both objects for either or both of node 109 and node 111. In any case, node 110 stores the instances of object X and object Y in a different storage device to restore the replicas.

Figure 6B:
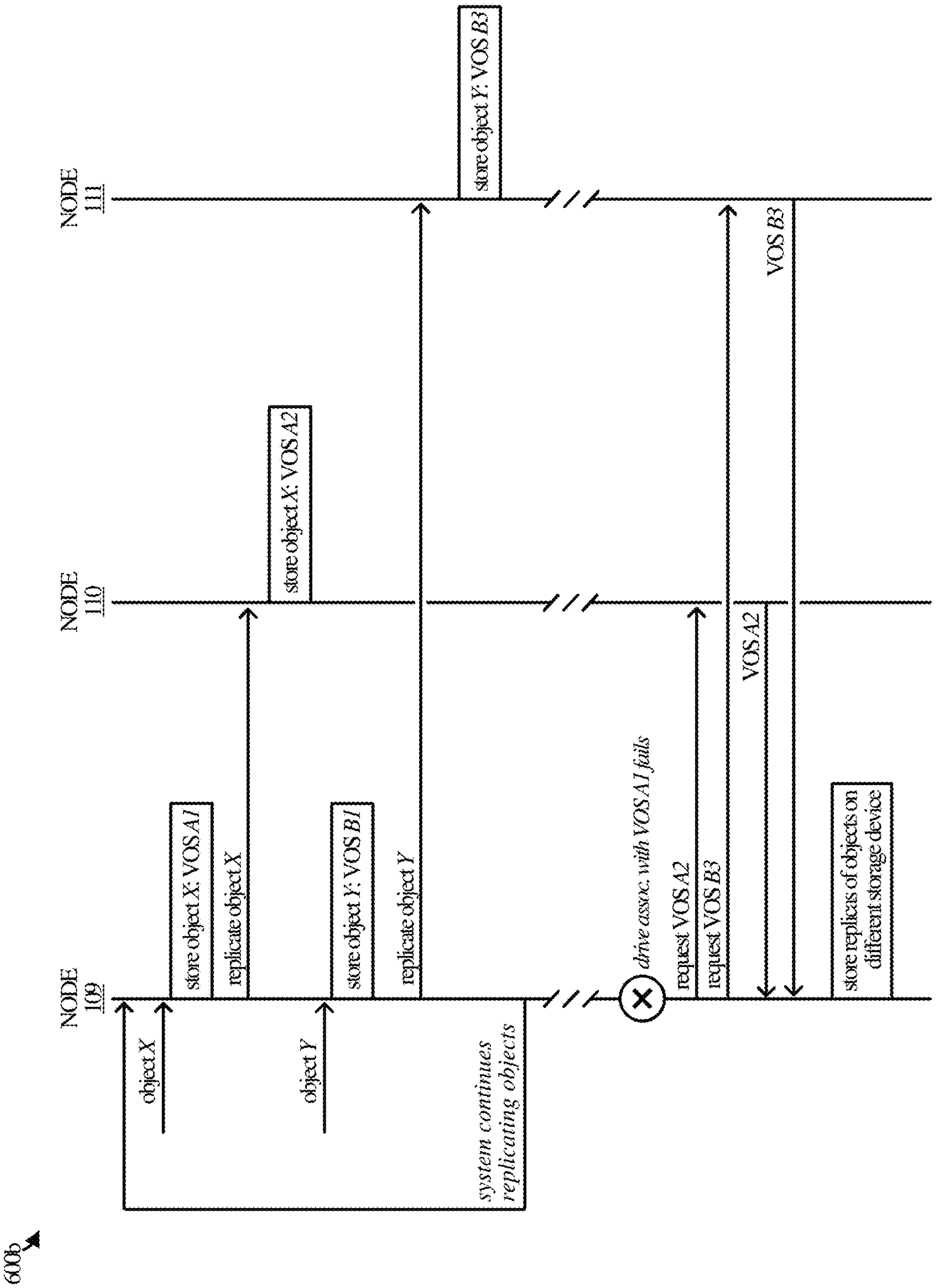
FIG. 6B illustrates an operational sequence in accordance with an implementation.

FIG. 6B represents operational sequence 600*b* in accordance with an embodiment. Operational sequence 600*b* includes node 109, node 110, and node 111, each of FIG. 1, respectively. Each of node 109, node 110, and node 111 are described in detail in the text associated with FIG. 1. Operational sequence 600*b* is generally representative of a replica restoring process and may be considered with regard to the steps and elements of each of the preceding figures.

To begin, node 109 receives object X for replication and storage. Node 109 stores an instance (i.e., replica) of object X in a storage device of node 109 and distributes a copy of object X to node 110. Node 109 associates the stored replica of object X with virtual object space A1. Node 110 stores an instance of object X in a storage device of node 110 and associates the replica with virtual object space A2.

Node 109 then receives object Y for replication and storage. Node 109 stores an instance (i.e., replica) of object Y in a storage device of node 109 and distributes a copy of object Y to node 111. Node 109 associates the stored replica of object Y with virtual object space B1. Node 111 stores an instance of object Y in a storage device of node 111 and associates the replica with virtual object space B3.

Each of node 109, node 110, and node 111 continue receiving, replicating, and storing objects. At some point, a storage device of node 109 undergoes a restoration event. In the embodiment shown in FIG. 6B, the restoration event is a drive failure. In response, node 109 looks up the virtual object spaces associated with the storage device. Node 109 then looks up the placement groups associated with the virtual object spaces and the objects associated with the placement groups. In some embodiments, node 109 reads metadata (e.g., metadata tables 500 of FIG. 5) in order to identify the virtual object spaces associated with the storage device, the placement groups associated with the virtual object spaces, and the objects associated with the placement groups.

Node 109 identifies that virtual object space A1 and virtual object space B1 were associated with the storage device of node 109 that underwent the restoration event. Node 109 then requests and receives an instance of virtual object space A2 from node 110 and an instance of virtual object space B3 from node 111. Node 110 stores the content of virtual object space A2 and virtual object space B3, which include instances of object X and object Y respectively, in a different storage device to restore the replicas.

Figure 7:
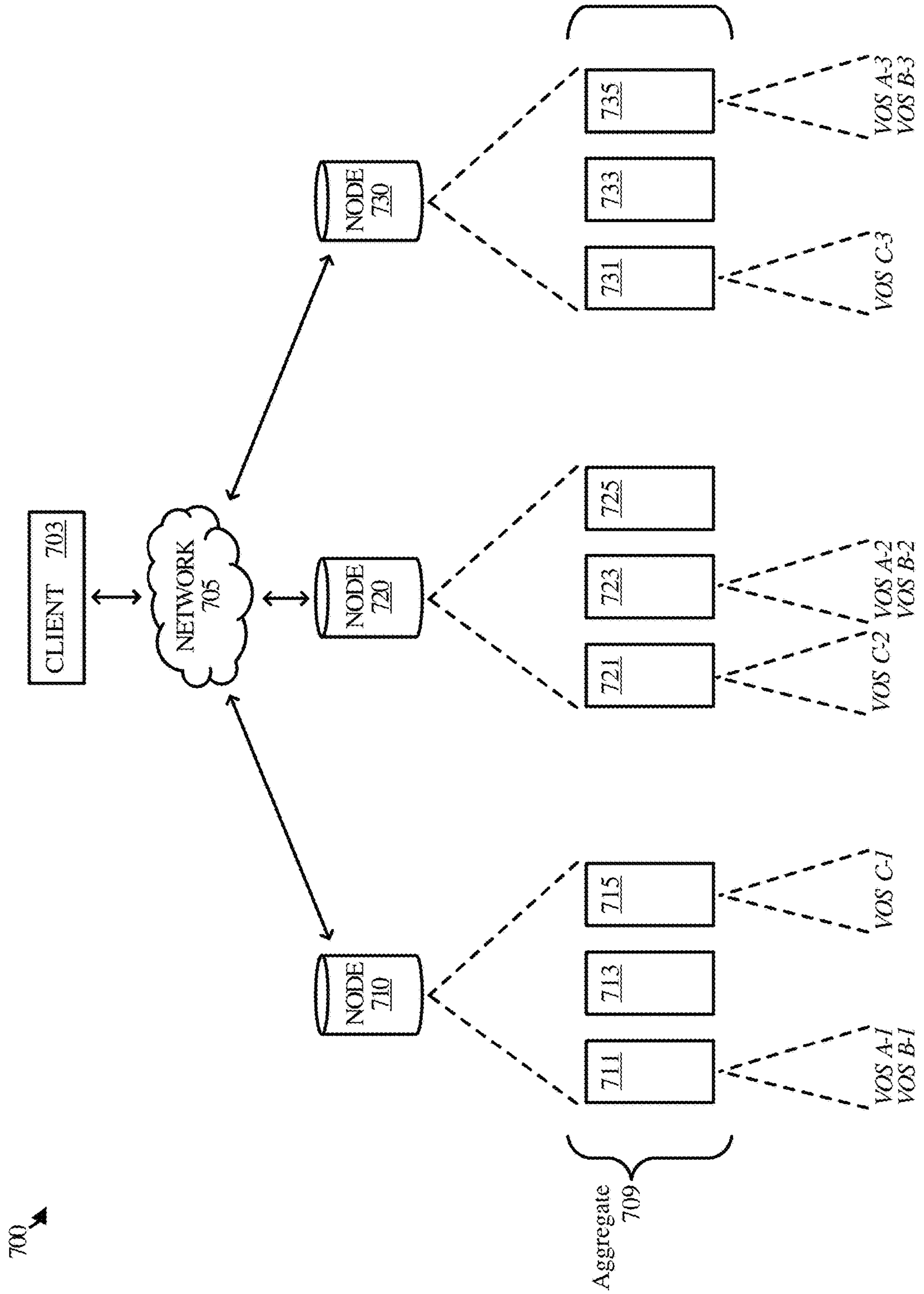
FIG. 7 illustrates an operational scenario in accordance with an implementation.

FIG. 7 represents operational environment 700 in accordance with an embodiment. Operational environment 700 includes client 703, network 705, node 710, node 720, and node 730. Node 710 further includes drive 711, drive 713, and drive 715. Node 720 further includes drive 721, drive 723, and drive 725. Node 730 further includes drive 731, drive 733, and drive 735.

Client 703 is generally representative of a client that interacts with an object storage system in order to carry out object storage processes. Other examples of such clients are given by client 101 of FIG. 1. Network 705 is generally representative of a system of interconnected devices and communication links configured to transmit data between devices using one or more communication protocols. Client 703 interacts with the elements of an object storage system (e.g., node 710, node 720, and node 730) via network 705.

Each of node 710, node 720, and node 730 are generally representative of a node of an object storage system, other examples of which are provided by node 109, node 110, and node 111, each of FIG. 1 respectively and described in detail in the text associated with FIG. 1. Node 710 includes drive 711, drive 713, and drive 715, each of which are generally representative of storage media sufficient to store objects and replicas of objects. Node 720 includes drive 721, drive 723, and drive 725, each of which are generally representative of storage media sufficient to store objects and replicas of objects. Node 730 includes drive 731, drive 733, and drive 735, each of which are generally representative of storage media sufficient to store objects and replicas of objects. Each of drive 711, drive 713, drive 715, drive 721, drive 723, drive 725, drive 731, drive 733, and drive 735 collectively make up aggregate 709. Aggregate 709 is representative of a storage aggregate, the storage resources of which are utilized by an object storage service (e.g., object storage service 103 of FIG. 1) in order to provide object storage services to clients (e.g., client 703).

Regarding node 710, drive 711 is associated with virtual object space A1 and virtual object space B1, and drive 715 is associated with virtual object space C1. Regarding node 720, drive 721 is associated with virtual object space C2, and drive 723 is associated with virtual object space A2 and virtual object space B2. Regarding node 730, drive 731 is associated with virtual object space C3, and drive 725 is associated with virtual object space A3 and virtual object space B3.

Figure 8:
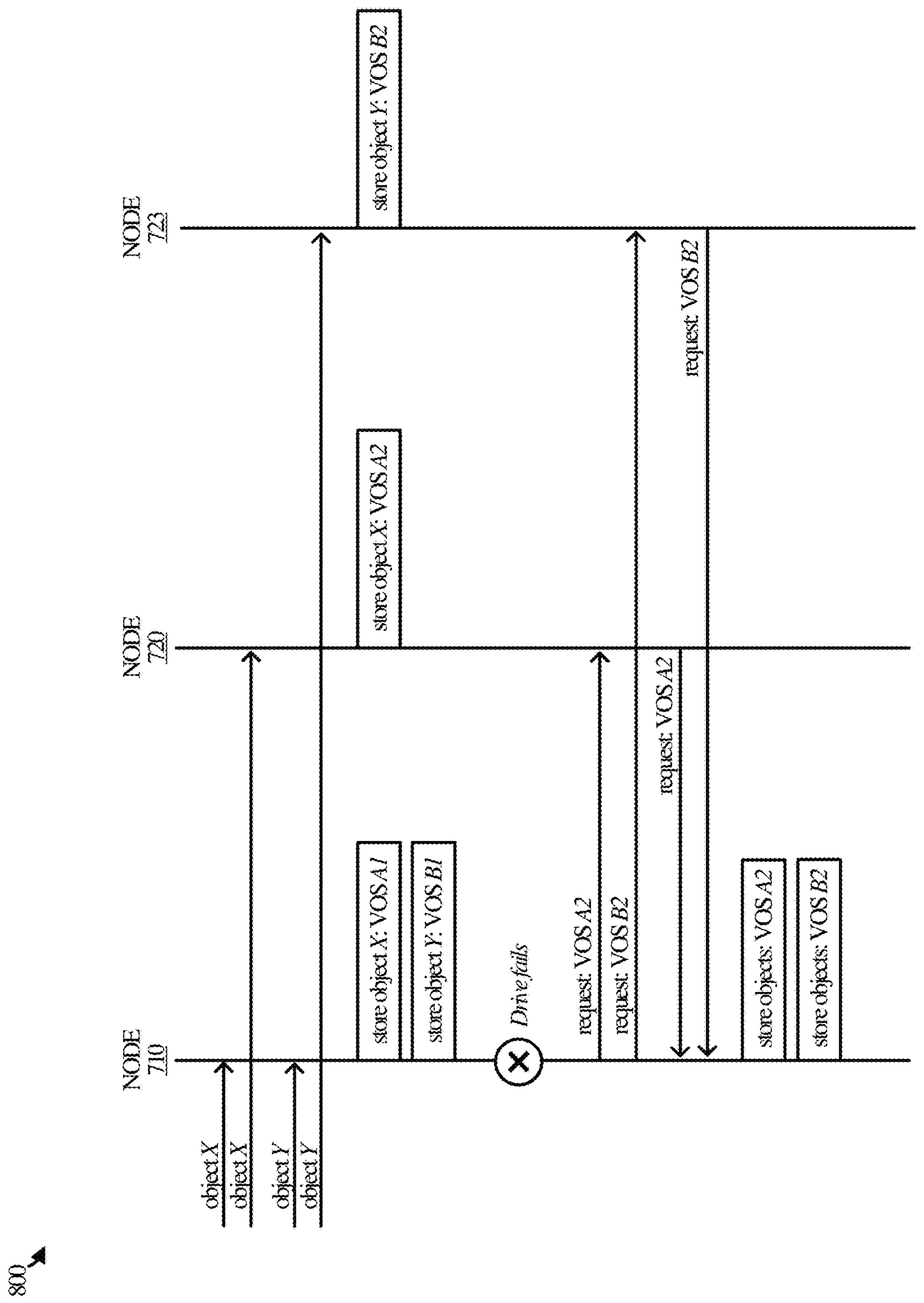
FIG. 8 illustrates an operational sequence in accordance with an implementation.

FIG. 8 represents operational sequence 800 in accordance with an embodiment. Operational sequence 800 includes node 710, node 720, and node 730 each of FIG. 7, respectively. Operational sequence 800 is generally representative of a replica storing process in an object storage system and may be considered with regard to the steps and elements of each of the preceding figures. Operational sequence 800 may comprise operational instructions that, when executed by a processor of a computing device (e.g., storage node 710), direct processors of the computing device to act in accordance with the techniques of operational sequence 800. An example of such a computing device is given by computing device 1005 of FIG. 10.

To begin, node 710, node 720, and node 730 receive replicas of objects to store. In the embodiment illustrated in FIG. 8, a replication scheme governing the number of replicas generated for a given object stored in the object storage system is configured such that object X and object Y are each replicated twice. Each of node 710 and node 720 receive an instance of object X (i.e., a replica of object X), while each of node 710 and node 730 receive an instance of object Y (i.e., a replica of object Y). In other embodiments, the number of replicas created for a given object under different replication schemes may vary widely. For example, one replication scheme may call for the generation and storage of three replicas for each object stored in the object system. In another example, a replication scheme may call for the generation and storage of ten replicas for each object stored in the object system.

Node 710 receives and stores a replica of object X in a drive (e.g., drive 711 of FIG. 7) and associates the object with virtual object space A1. Similarly, node 710 receives a replica of object Y, stores the replica on a drive of node 710, and associates the replica with virtual object space B1. Node 720 receives and stores a replica of object X in a drive (e.g., drive 721 of FIG. 7) and associates the object with virtual object space A2. Similarly, node 730 receives a replica of object Y, stores the replica on a drive of node 730, and associates the replica with virtual object space B2.

At this point, a drive of node 710 fails. Node 710 detects the failure and in response, identifies that virtual object space A2 and virtual object space B2 were associated with the failed drive. Node 710 then requests virtual object space A2 from node 720 and virtual object space B2 from node 730. Node 710 then stores the content of virtual object space A2 and virtual object space B2 in a different drive of node 710 to restore the content of the failed drive.

Figure 9:
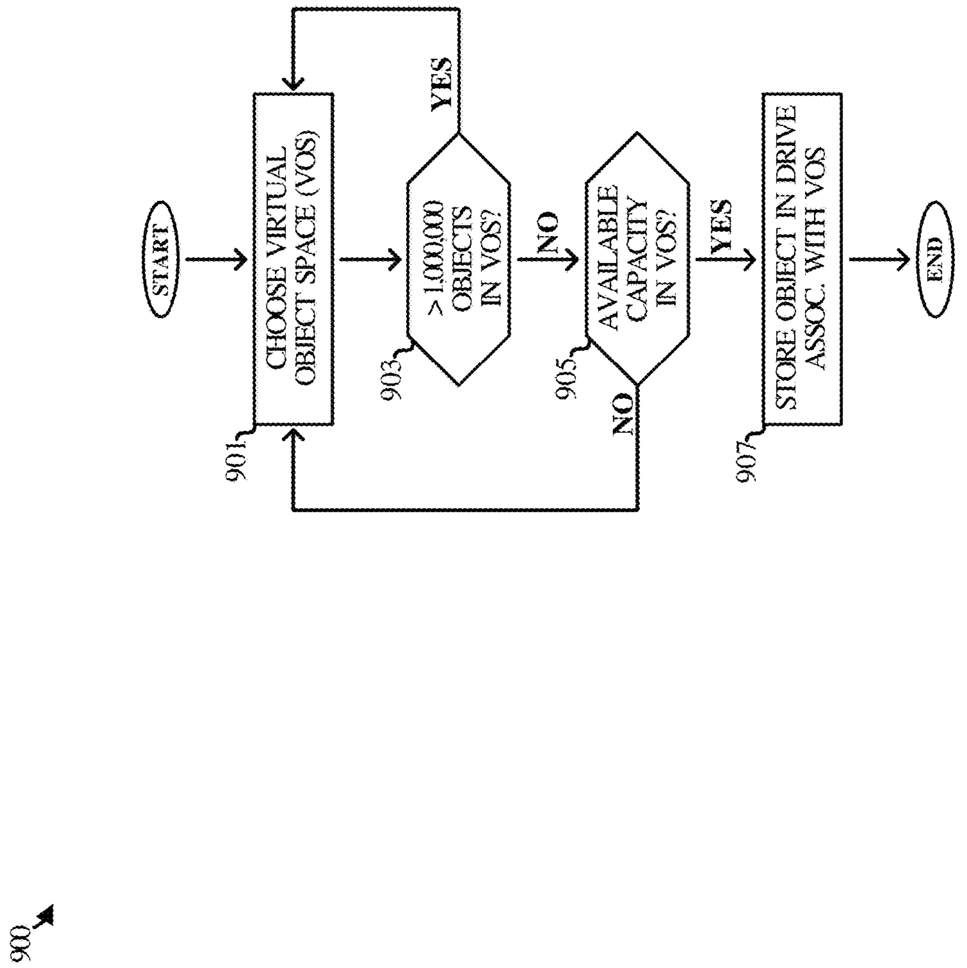
FIG. 9 illustrates a method in accordance with an implementation.

FIG. 9 illustrates method 900 in an implementation. Method 900 is representative of a process for managing replicas of data objects in an object storage system. Method 900 may be implemented in program instructions in the context of the software and/or firmware elements of each of node 710, node 720, and node 730, each of FIG. 7, respectively. The program instructions, when executed by one or more processing devices of one or more computing systems (e.g., computing device 1005 in FIG. 10), direct the one or more computing systems to operate as follows, referring parenthetically to the steps in FIG. 9, and in the singular to a computing device for the sake of clarity.

Method 900 is representative of a portion of the storage processes of an object storage service as described herein, an example of which is given by storage method 200 of FIG. 2. To begin, a storage node (e.g., node 710) of the object storage service selects a virtual object space (step 901). In some embodiments, the selection of a virtual object space is arbitrary and performed only as a means to track and map the placement of replicas. In some embodiments, virtual object spaces are selected in accordance with load balancing practices. For example, where a virtual object space is selected in order to optimize load balancing, a virtual object space associated with a storage device that is being under-utilized may not be selected where another virtual object space is associated with a storage device that is being heavily utilized (e.g., the storage capacity is full, etc.) Virtual object spaces may further be selected to optimize processing resources. For example, where a node of the distributed object storage system is responsible for a large number of processes compared to the processing resources of another node, the virtual object space associated with the greater proportion of available processing resources will be utilized.

The node selects the virtual object space in order to associate the virtual object space and a replica of an object being stored. The node then determines whether or not the selected virtual object space is associated with greater than a maximum threshold (step 903). To determine how many data objects are associated with a given node, the node can read storage metadata (e.g., metadata 403) to evaluate the number of objects associated with the given node. Where the node determines that the virtual object space is associated with greater than one million objects, the node does not select virtual object space, and the virtual object space will therefore not be associated with an additional replica of an object. As a result, another virtual object space is selected. In some embodiments, the node updates metadata to indicate that one of the virtual object spaces is at capacity. In such embodiments, another node in the process of identifying a virtual object space as part of storing an object can read the indication and will responsively skip that virtual object space.

Where the node determines that the selected virtual object space is associated with less than one million objects, the node then determines whether or not the storage device associated with the virtual object space has available capacity to hold the replica of the object (step 905). Where the node determines that the storage device associated with the virtual object space does not have available capacity to store the replica, the node does not select the virtual object space, and the virtual object space will therefore not be associated with an additional replica of an object. As a result, another virtual object space is selected. In some cases, determining whether a virtual object space is at capacity with respect to the number of associated objects and whether or not the storage device associated with the virtual object space has the storage capacity available for another data object are performed as components of a single evaluation.

Where the node determines that the storage device associated with the virtual object space has available capacity to store the replica of the object, the node stores the replica in the storage drive associated with the selected virtual object space (step 907).

Figure 10:
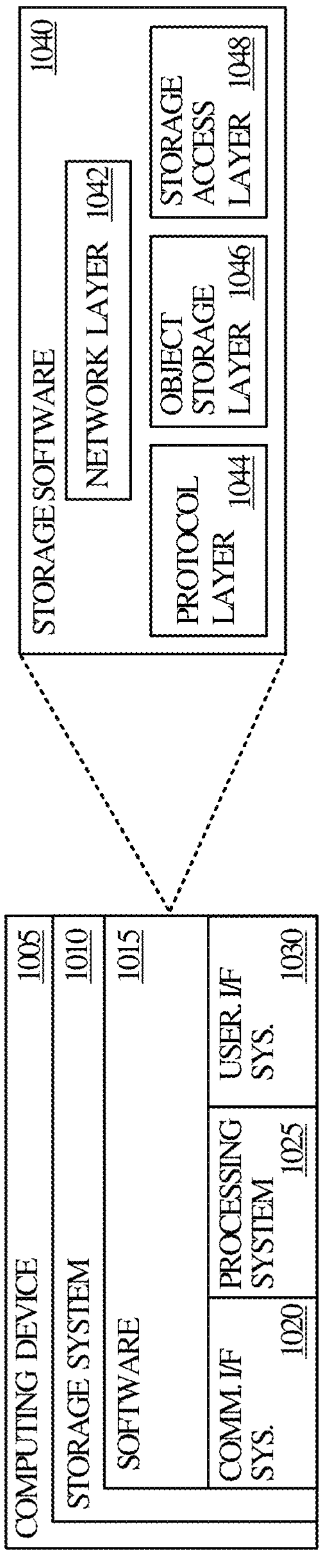
FIG. 10 illustrates a computing device used in several implementations.

FIG. 10 illustrates computing device 1005, which is representative of any system or collection of systems in which the various applications, processes, services, and scenarios disclosed herein may be implemented. Examples of computing apparatus illustrated by computing device 1005 include, but are not limited to server computers, web servers, cloud computing platforms, and data center equipment, as well as any other type of physical or virtual server machine, container, and any variation or combination thereof. In some examples, computing device 1005 may also be representative of desktop and laptop computers, tablet computers, and the like.

In some cases, computing device 1005 is configured to provide storage node functionality (e.g., storage controller functionality) as a component of an object storage system. In such cases, computing device 1005 executes storage software 1040 via processing system 1025. Storage software 1040 is representative of a generic example of an operating system of the computational resources of a computing device sufficient to provide object storage services as part of an object storage system. In addition, it will be understood to those skilled in the art that the disclosure described herein may apply to any type of special-purpose (e.g., file server, filer or storage serving appliance) or general-purpose computer, including a standalone computer or portion thereof, embodied as or including a storage system. Storage software 1040 includes network layer 1042, protocol layer 1044, object storage layer 1046, and storage access layer 1048.

Network layer 1042 is generally representative of software for managing network communications and data transfer operations between computing device 1005 and external computing devices networked with computing device 105. Protocol layer 1044 is generally representative of software for managing and implementing data exchange procedures that support the network communication facilitated by network layer 1042. Object storage layer 1046 is generally representative of software for managing storage, retrieval, and organization of data as unstructured data objects. Storage access layer 1048 is generally representative of software for interfacing with underlying physical or virtual storage resources in order to perform read and write operations on the storage resources.

In some cases, the processes of the object storage system described herein (e.g., storage method 200 and restoration method 300) are implemented entirely by object storage layer 1046. In some other cases, the processes of the object storage system described herein are performed in part by object storage layer 1046 and in part by other elements of storage software 1040. For example, object storage layer 1046 may identify a virtual object space to store a given replica (i.e., storage method 200) and then direct storage access layer 1048 to store the given replica on the particular drive associated with the virtual object space.

Computing device 1005 may be implemented as a single apparatus, system, or device or may be implemented in a distributed manner as multiple apparatuses, systems, or devices. Computing device 1005 includes, but is not limited to, processing system 1025, storage system 1010, software 1015, communication interface system 1020, and user interface system 1030. Processing system 1025 is operatively coupled with storage system 1010, communication interface system 1020, and user interface system 1030.

Processing system 1025 loads and executes software 1015 from storage system 1010. Software 1015 includes and implements storage software 1040, which is representative of the processes discussed with respect to the preceding Figures. When executed by processing system 1025, software 1015 directs processing system 1025 to operate as described herein for at least the various processes, operational scenarios, and sequences discussed in the foregoing implementations. Computing device 1005 may optionally include additional devices, features, or functionality not discussed for purposes of brevity.

Referring still to FIG. 10, processing system 1025 may include a micro-processor and other circuitry that retrieves and executes software 1015 from storage system 1010. Processing system 1025 may be implemented within a single processing device but may also be distributed across multiple processing devices or sub-systems that cooperate in executing program instructions. Examples of processing system 1025 include general purpose central processing units, microcontroller units, graphical processing units, application specific processors, integrated circuits, application specific integrated circuits, and logic devices, as well as any other type of processing device, combinations, or variations thereof.

Storage system 1010 may comprise any computer readable storage media readable by processing system 1025 and capable of storing software 1015. Storage system 1010 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. Storage system 1010 may be implemented as a single storage device but may also be implemented across multiple storage devices or sub-systems co-located or distributed relative to each other. Storage system 1010 may comprise additional elements, such as a controller, capable of communicating with processing system 1025 or possibly other systems.

Software 1015 (including storage software 1040) may be implemented in program instructions and among other functions may, when executed by processing system 1025, direct processing system 1025 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1015 may include additional processes, programs, or components, such as operating system software, virtualization software, or other application software. Software 1015 may also comprise firmware or some other form of machine-readable processing instructions executable by processing system 1025.

In general, software 1015, when loaded into processing system 1025 and executed, transforms a suitable apparatus, system, or device (of which computing device 1005 is representative) overall from a general-purpose computing system into a special-purpose computing system customized to support object replication and storage processes as described herein. Indeed, encoding software 1015 on storage system 1010 may transform the physical structure of storage system 1010. The specific transformation of the physical structure may depend on various factors in different implementations of this description. Examples of such factors may include, but are not limited to, the technology used to implement the storage media of storage system 1010 and whether the computer-storage media are characterized as primary or secondary storage, as well as other factors.

For example, if the computer readable storage media are implemented as semiconductor-based memory, software 1015 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1020 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 1005 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

The invention claimed is:

1. A method for managing objects in an object storage environment having multiple storage nodes, the method comprising:

by each storage node of the multiple storage nodes in the object storage environment to which an object is being replicated:

identifying a virtual object space to associate with a replica of the object being replicated across the storage nodes, wherein the virtual object space comprises one of multiple virtual object spaces associated with a placement group;

identifying a storage device associated with the virtual object space;

storing the replica of the object on the storage device;

updating metadata to associate the placement group with the object; and in response to a restoration event associated with the storage device, restoring content from the storage device to a different storage device based on the metadata, wherein the metadata associates objects with placement groups, placement groups with virtual object spaces, and virtual object spaces with storage devices.

2. The method of claim 1, wherein restoring content from the storage device to the different storage device based on the metadata comprises:

identifying one or more virtual object spaces associated with the storage device;

identifying one or more placement groups associated with the one or more virtual object spaces; and identifying objects associated with the one or more placement groups.

3. The method of claim 2, wherein restoring the content based on the metadata further comprises:

obtaining replicas of the objects from one or more others of the multiple storage nodes.

4. The method of claim 3, further comprising storing the replicas of the objects on the different storage device to restore the objects to the different storage device.

5. The method of claim 4, wherein the restoration event comprises one of:

a failure of the storage device; and a decommissioning of the storage device.

6. The method of claim 1, wherein storing the replica of the object on the storage device comprises:

identifying, for the virtual object space associated with the storage device, a corresponding portion of storage on the storage device; and writing the replica to the corresponding portion of storage.

7. A storage controller comprising:

one or more non-transitory computer readable storage media;

one or more processors operatively coupled with the one or more non-transitory computer readable storage media; and program instructions stored on the one or more non-transitory computer readable storage media that, when read and executed by the one or more processors, direct the storage controller to at least:

identify a virtual object space to associate with a replica of an object, wherein the virtual object space comprises one of multiple virtual object spaces associated with a placement group, identify a storage device associated with the virtual object space, store the replica of the object on the storage device, update metadata to associate the placement group with the object, and in response to a restoration event associated with the storage device, restore content from the storage device to a different storage device based on the metadata, wherein the metadata associates objects with placement groups, placement groups with virtual object spaces, and virtual object spaces with storage devices.

8. The storage controller of claim 7, wherein the program instructions directing the storage controller to restore the content from the storage device further comprise instructions that, when executed, direct the storage controller to:

identify one or more virtual object spaces associated with the storage device;

identify one or more placement groups associated with the one or more virtual object spaces; and identify objects associated with the one or more placement groups.

9. The storage controller of claim 8, wherein the program instructions directing the storage controller to restore the content based on the metadata further comprises instructions that, when executed, direct the storage controller to:

obtain replicas of the objects from one or more other storage nodes.

10. The storage controller of claim 9, wherein the program instructions further comprise instructions that, when executed, direct the storage controller to:

store the replicas of the objects on the different storage device to restore the objects to the different storage device.

11. The storage controller of claim 10, wherein the program instructions directing the storage controller to identify the virtual object space further comprise instructions that, when executed, direct the storage controller to:

generate an instance of a virtual object space with which to associate with the replica of the object.

12. The storage controller of claim 7, wherein the program instructions directing the storage controller to store the replica of the object on the storage device further comprises instructions that, when executed, direct the storage controller to:

identify, for the virtual object space associated with the storage device, a corresponding portion of storage on the storage device; and write the replica to the corresponding portion of storage.

13. One or more non-transitory computer readable storage media having program instructions stored thereon that, when read and executed by one or more processors of a computing device, direct the computing device to at least:

identify a virtual object space to associate with a replica of an object, wherein the virtual object space comprises one of multiple virtual object spaces associated with a placement group;

identify a storage device associated with the virtual object space;

store the replica of the object on the storage device;

update metadata to associate the placement group with the object; and in response to a restoration event associated with the storage device, restore content from the storage device to a different storage device based on the metadata, wherein the metadata associates objects with placement groups, placement groups with virtual object spaces, and virtual object spaces with storage devices.

14. The one or more non-transitory computer readable storage media of claim 13, wherein the program instructions directing the computing device to restore the content from the storage device further comprises instructions that, when executed, direct the computing device to:

identify one or more virtual object spaces associated with the storage device;

identify one or more placement groups associated with the one or more virtual object spaces; and identify objects associated with the one or more placement groups.

15. The one or more non-transitory computer readable storage media of claim 14, wherein the program instructions directing the computing device to restore the content based on the metadata further comprises instructions that, when executed, direct the computing device to:

obtain replicas of the objects from one or more other storage nodes.

16. The one or more non-transitory computer readable storage media of claim 15, wherein the program instructions further comprise instructions that, when executed, direct the computing device to:

store the replicas of the objects on the different storage device to restore the objects to the different storage device.

17. The one or more non-transitory computer readable storage media of claim 16, wherein the program instructions directing the computing device to update the metadata further comprises instructions that, when executed, direct the computing device to:

update the metadata to reflect one or more of the association between the virtual object space and the object and the placement group and the object.

18. The one or more non-transitory computer readable storage media of claim 13, wherein the program instructions directing the computing device to store the replica of the object on the storage device further comprises instructions that, when executed, direct the computing device to:

identify, for the virtual object space associated with the storage device, a corresponding portion of storage on the storage device; and write the replica to the corresponding portion of storage.

19. A method for restoring content of a storage device in an object storage environment in response to a restoration event, the method comprising:

identifying, by a storage node of the object storage environment, one or more virtual object spaces associated with the storage device;

identifying one or more placement groups associated with the one or more virtual object spaces;

identifying objects associated with the one or more placement groups;

obtaining replicas of the objects from one or more other storage nodes of the object storage environment; and storing the replicas of the objects on a different storage device of the object storage environment.

20. The method of claim 19, wherein identifying the virtual object space comprises generating, by the storage node, a new virtual object space with which to associate with the replica of the object.

* * * * *